US009977416B2

(12) United States Patent
Garg (10) Patent No.: US 9,977,416 B2
(45) Date of Patent: May 22, 2018

(54) INDUSTRIAL HARDWARE INSTALLATION BASE REPORTING AND FAILURE MONITORING (75) Inventor: Anika Garg, Minneapolis, MN (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 528 days.

(21) Appl. No.: 13/528,198

(22) Filed: Jun. 20, 2012

(65) Prior Publication Data
US 2013/0345829 A1 Dec. 26, 2013

(51) Int. Cl.
G05B 19/042 (2006.01)

(52) U.S. Cl.
CPC .............................. G05B 19/0428 (2013.01)

(58) Field of Classification Search
CPC .................................................. G05B 19/0428
USPC .......................................................... 700/9
See application file for complete search history.

(56) References Cited

U.S. PATENT DOCUMENTS

| 5,452,201 | A * | 9/1995 | Pieronek ............ G05B 19/0421 700/83 |
| 7,596,095 | B2 * | 9/2009 | Chen ................... H04L 12/2697 370/244 |
| 7,725,528 | B1 | 5/2010 | Zink et al. |
| 8,156,232 | B2 | 4/2012 | Callaghan et al. |
| 2003/0236860 | A1 | 12/2003 | Yegin |
| 2007/0058929 | A1 | 3/2007 | Chaffee |
| 2007/0073850 | A1 * | 3/2007 | Callaghan ............... G05B 19/05 709/220 |
| 2007/0168571 | A1 | 7/2007 | Ramsey et al. |
| 2007/0186011 | A1 | 8/2007 | Batke et al. |
| 2007/0237141 | A1 * | 10/2007 | Marchese ........... H04L 41/0853 370/389 |
| 2009/0037872 | A1 | 2/2009 | Schnabele et al. |

(Continued)

FOREIGN PATENT DOCUMENTS

EP 3007386 A1 4/2016
WO 2013184117 A1 12/2013

OTHER PUBLICATIONS

Microsoft, Windows Error Reporting, applies to: Windows Server 2008 R2.*

(Continued)

Primary Examiner — Miranda Huang
Assistant Examiner — John Park
(74) Attorney, Agent, or Firm — Boyle Fredrickson, SC (57) ABSTRACT An industrial control system includes an industrial controller with a processor executing a program stored in a non-transitory computer-readable storage medium and having a user interface and a network interface for communicating over a first control network with another industrial controller having a network interface. The other industrial controller has an additional network interface for communicating over a second control network with an industrial device. The program instructs the processor to retrieve installation information contained in the other industrial controller and the industrial device; build a data structure comprising the retrieved information; periodically monitor for a hardware failure; and send a message alarm in response to detection of a hardware failure. As a result, the installation base of the industrial system and any hardware failures are quickly understood and martial data collection is avoided.

28 Claims, 7 Drawing Sheets (56) References Cited

U.S. PATENT DOCUMENTS

| | | |
|---|---|---|
| 2009/0222541 A1 | 9/2009 | Monga et al. |
| 2010/0298955 A1 | 11/2010 | Grgic et al. |
| 2011/0060427 A1 | 3/2011 | Batke et al. |
| 2013/0212574 A1* | 8/2013 | Hutchinson ........... H04L 41/082 717/172 |
| 2015/0156285 A1 | 6/2015 | Blair |
| 2015/0161394 A1 | 6/2015 | Ferragut et al. |

OTHER PUBLICATIONS

Sematech, "Failure Reporting, Analysis and Corrective Action System", 1993, p. 1-14.*
System Ferret.
Extended European Search Report; Application No. 15188089.5.
Rockwell Automation; System Ferret; Website: www.rockwellautomation.com/solutions/integratedarchitechture/resources4, 2012: US.
Rockwell Automation; "The Common Industrial Protocol (CIP) and the Family of CIP Networks; Publication;" Copyright 2006, Open DeviceNet Vendor Association, Inc.: p. 1-84, US.
Rockwell Automation Publication; "Logix5000 Controllers Add-On Instructions,"; Programming Manual; 1756-PM010E-EN-P, Sep. 2012; p. 1-98; US.
Extended European Search Report dated June 20, 2017; Application No. 17150084,6—(12) pages.
European Examination Report for Application No. 15 188 089.5: dated May 24, 2017.

* cited by examiner

FIG. 1

| ID | H/W Loc., Node no., IP Addr. | Serial No. | Mfg. Date | Prod. Type | Dev. Code | H/W Descr. | F/W Rev. | Fault Flag(s) | Slot No. | Monitoring Param. |
|---|---|---|---|---|---|---|---|---|---|---|
| 0000 | | | | | | | | | | |
| 0001 | | | | | | | | | | |
| 0002 | | | | | | | | | | |

INDUSTRIAL HARDWARE INSTALLATION BASE REPORTING AND FAILURE MONITORING

BACKGROUND OF THE INVENTION

The present invention relates to industrial control systems and, in particular, to the retrieval of installation information and monitor of hardware failures in industrial control systems.

Industrial controllers, such as programmable logic controllers (PLC's), are specialized electronic computer systems used for the control of industrial processes or machinery, for example, in a factory environment. Industrial controllers differ from conventional computers in a number of ways. Physically, they are constructed to be substantially more robust against shock and damage and to better resist external contaminants and extreme environmental conditions. The processors and operating systems are optimized for real-time control and execute languages allowing ready customization of programs to comport with a variety of different controller applications. Industrial controllers may have a user interface for accessing, controlling and/or monitoring the industrial controller, such as through a locally connected terminal having a keyboard, mouse and display.

Typically, industrial controllers have a highly modular architecture that allows different numbers and types of network cards or adapters to be used to connect the controllers to the process or machinery to be controlled through special "control networks" suitable for highly reliable and available real-time communication. Such control networks commonly used in industrial control systems include, for example, ControlNet, DeviceNet, EtherNet/IP and Sercos, whose specifications are published and whose protocols are used broadly by a number of manufacturers and suppliers. Control networks differ from standard communication networks, such as Ethernet, by guaranteeing maximum communication delays. This may be obtained, for example, by pre-scheduling the bandwidth of the network and/or providing redundant communication capabilities to high-availability. Control networks also differ from one another in physical aspects, for example, the type of media (e.g., co-axial cable, twisted pair, light fiber, etc.), the protocols of its operation, (e.g., Baud rate, number of channels, word transmission size, use of connected messaging, etc.) and how the data is formatted and how it is collected into standard messages.

As part of their enhanced modularity, industrial controllers may employ one or more industrial devices coupled through the control networks. Industrial devices may comprise one or more I/O modules, AC/DC drives, motion drives or other hardware devices dedicated to a particular type of industrial function, for example, detecting input AC or DC signals or controlling output AC or DC signals in conjunction with an industrial process, or running motors or other machinery. Each I/O module or drive may have a connector system allowing them to be installed in different combinations in an industrial device along with other selected I/O modules or drives to match the demands of the particular application. Multiple industrial devices may be located at convenient control points near the controlled process or machine to communicate with the industrial controller via the control network.

Industrial controllers and/or industrial devices may be added, removed and/or updated periodically throughout a factory environment. For example, a new industrial process may be added via a new industrial device to increase the capability or the capacity of the industrial system. Similarly, an existing industrial controller and/or industrial device in an industrial system may be modified to include updated hardware or updated firmware. In some applications, industrial controllers and/or industrial devices must also be added, removed and/or updated while the industrial system is actively running. This may occur, for example, when interrupting the process would cause costly downtime and/or product defects. Consequently, the industrial system may typically change over time and throughout physically dispersed areas in the factory.

Understanding the installation base of the industrial system, including the location and configuration of each industrial controller, industrial device and control network, is important in many respects. An accurate understanding of the installation base permits an accurate assessment of the industrial system for effectiveness, upgradeability and expansion or removal of equipment. In addition, an accurate understanding of the installation base permits a significantly faster root cause analysis in the event of a hardware failure.

A tool for collecting limited information contained at the first network level, or primary level, of an industrial system, such as the device name, IP address and serial number in industrial controllers, is known as provided by System Ferret offered by Rockwell Automation, Inc. of Milwaukee, Wis. However, collection of additional installation information at the primary level, such as the hardware area location with node number or IP address, product type, device code, hardware description, firmware revision, major and minor fault flag, slot number, and important condition monitoring parameters, and collection of any information contained in nodes on extended control networks in the industrial system, such as industrial devices, typically requires manual data collection. Manual data collection often requires an engineer or technician to inspect each hardware device in the industrial system, sometimes physically connecting to each device with a portable electronic device, and recording the installation information. Manual data collection is often time consuming and subject to human error. This is further complicated by the industrial system changing over time and throughout physically dispersed areas. In addition, upon a failure occurring in the industrial system, precisely locating the hardware failure and obtaining information specific to the hardware failure, similarly requires manual data collection which may similarly be time consuming and subject to human error.

SUMMARY OF THE INVENTION

Aspects of the present invention provide an industrial controller with a processor executing a program stored in a non-transitory computer-readable storage medium and having a user interface and a network interface. The network interface allows communicating over a first control network with another industrial controller having a network interface. The other industrial controller also has an additional network interface for communicating over a second control network with an industrial device. The program instructs the processor to perform the following steps: (a) retrieve installation information contained in the other industrial controller and the industrial device by communicating over the first control network and over the second control network; (b) build a data structure comprising the retrieved information; (c) periodically monitor the other industrial controller and the industrial device provided in the data structure for a hardware failure by communicating over the first control network and over the second control network; and (d) send a message alarm in response to detection of a hardware failure. The program may also instruct the processor to generate an installation base evaluation report for understanding the plant installed base and gaining control of inventory. The program, may also instruct the processor to monitor important drive parameters for condition monitoring. The program may also auto discover the IP addresses or nodes for the remote network devices to avoid manual entry of the information which might be time consuming.

It is thus a feature of at least one embodiment of the invention to retrieve installation information contained in one or more industrial controllers and one or more industrial devices by communicating through a first network and one or more additional networks and to build a data structure comprising the retrieved information. It is also a feature of at least one embodiment of the invention to periodically monitor the one or more industrial controllers and the one or more industrial devices in the data structure for a hardware failure by communicating through the first network and the one or more additional networks and to send a message alarm in response to detection of the hardware failure. As a result, the installation base of the industrial system and any hardware failures may be, quickly understood and manual data collection that is time consuming and subject to human error may be avoided.

The industrial controller may further comprise performing a diagnostic on the other industrial controller or industrial device having a hardware failure by sending an input to the other industrial controller or industrial device and receiving an output from the other industrial controller or industrial device, the output including information specific to the hardware failure. The industrial controller may further comprise monitoring the condition of a parameter contained in the other industrial controller or the industrial device by periodically retrieving the parameter from the other industrial controller or the industrial device and updating the data structure with the retrieved parameter. The parameter may include installation information or any other information stored in the industrial controller or industrial device.

The installation information may include one or more of the device name, hardware area location including node number or IP address, serial number, manufacturing date, product type, device code, hardware description, firmware revision, major and minor fault flag, slot number and important condition monitoring parameters. The installation information retrieved from the other industrial controller may include installation information for network cards installed in the one or more industrial controllers. The installation information retrieved from the industrial device may include installation information for I/O modules or drives installed in the industrial device. The program may also comprise graphically displaying a pop-up to the user interface showing installation information, the pop-up also including an icon for graphically displaying help information.

Detection of the hardware failure occurs upon retrieving a local setting in the other industrial controller or the industrial device that indicates a failure, or upon retrieving a local setting in the other industrial controller or the industrial device that does not meet an expected result. The message alarm may include the date and time of the hardware failure and installation information identifying the hardware area location of the hardware failure, and may be graphically displayed to the user interface and/or sent via electronic mail. The control networks may variously include one or more networks according to ControlNet, DeviceNet, EtherNet/IP and/or Sercos protocols, or other control networks as known in the art, and the second control network may use a protocol different than the first control network.

Another embodiment of the present invention provides a method for retrieving installation information and monitoring for a hardware failure using a first industrial controller with a processor, a user interface and a network interface. The network interface allows communicating over a first control network with a second industrial controller having a network interface. The second industrial controller also has an additional network interface that allows communicating over a second control network with an industrial device. The method comprises (a) using the first industrial controller to retrieve installation information contained in the second industrial controller and the industrial device by communicating over the first control network and over the second control network; (b) building a data structure comprising the retrieved information; (c) periodically monitoring the second industrial controller and the industrial device provided in the data structure for a hardware failure by communicating over the first control network and over the second control network; and (d) sending a message alarm in response to detection of a hardware failure.

The method may further comprise performing a diagnostic on the second industrial controller or industrial device having a hardware failure by sending an input to the second industrial controller or industrial device and receiving an output from the second industrial controller or industrial device, the output including information specific to the hardware failure; and monitoring the condition of a parameter contained in the second industrial controller or industrial device by periodically retrieving the parameter from the second industrial controller or industrial device and updating the data structure with the retrieved parameter. The installation information retrieved from the second industrial controller and the industrial device may include the hardware area location. Detection of the hardware failure may occur upon retrieving a local setting in the second industrial controller or industrial device that indciates a failure, or upon retrieving a local setting in the second industrial controller or industrial device and determining that the local setting does not meet an expected result.

Another embodiment of the present invention provides an industrial control system, comprising a first industrial controller with a processor executing a program stored in a non-transitory computer-readable storage medium and having a user interface and a network interface, the network interface for communicating over a first control network; a second industrial controller having a network interface for communicating over the first control network, the second industrial controller also having an additional network interface for communicating over a second control network; and an industrial device having a network interface for communicating over the second control network. The program may instruct the processor to retrieve installation information contained in the second industrial controller and the industrial device by communicating over the first control network and over the second control network and build a data structure comprising the retrieved information. The program may also instruct the processor to periodically monitor the second industrial controller and the industrial device provided in the data structure for a hardware failure by communicating over the first control network and over the second control network and sending a message alarm in response to detection of a hardware failure.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
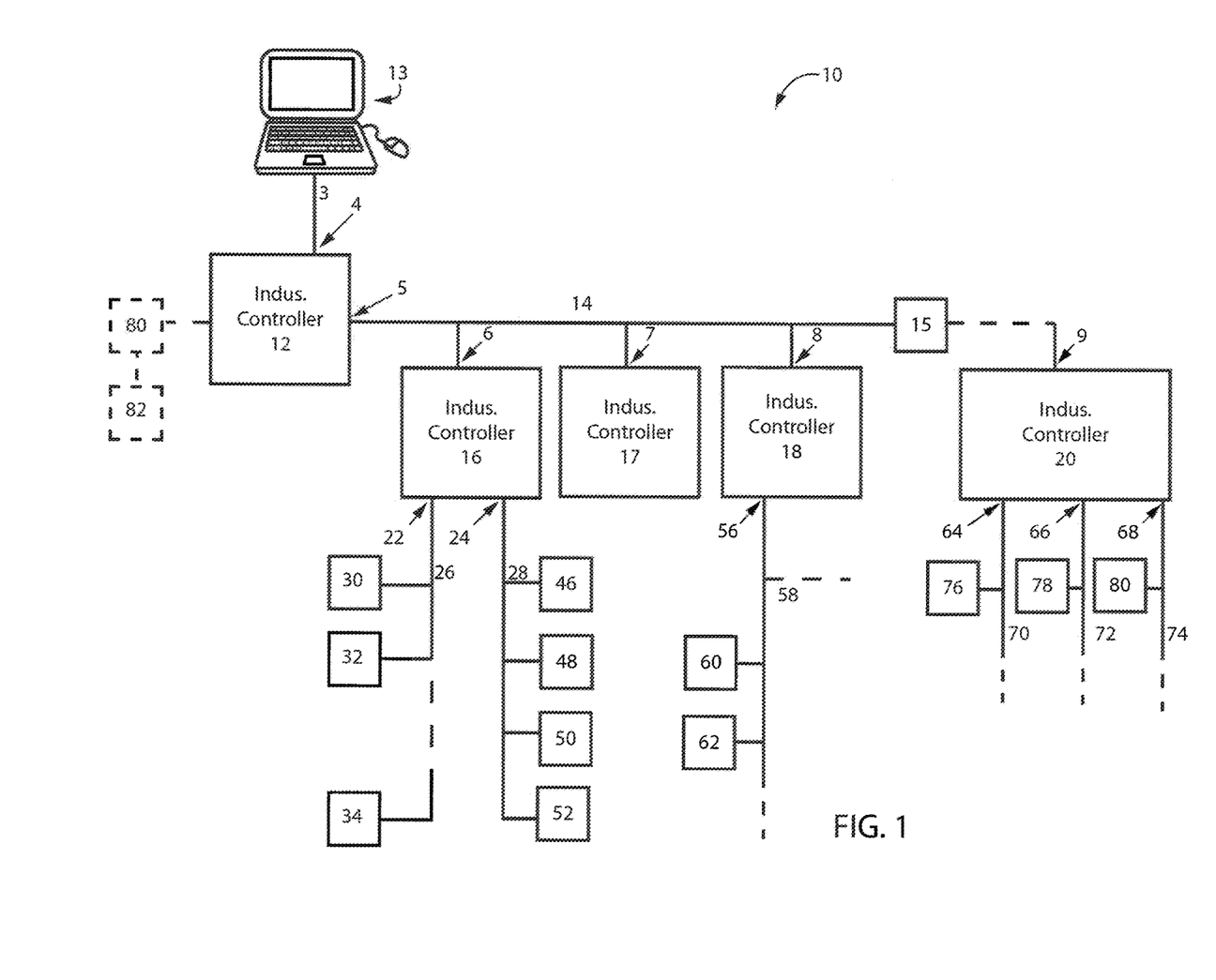
FIG. 1 is a simplified diagram of an industrial control system in accordance with an embodiment of the present invention.

Referring now to the drawings wherein like reference numbers correspond to similar components throughout the several views and, specifically, referring to FIG. 1, the present invention shall be described in the context of an industrial control system 10. The industrial control system 10 includes an industrial controller 12 with a processor executing a program 80 stored in a non-transitory computer-readable storage medium, such as ROM (e.g., EEPROM, Flash ROM), RAM (e.g., DRAM, SRAM) and/or disk (e.g., hard disk, floppy disk, CD, DVD), and having a user interface 13 and a network interface 5 for communicating over a first control network 14. The industrial controller 12 may be for example a programmable logic controller (PLC). The user interface 13 may, be a terminal locally connected to the industrial controller 12, perhaps through an Ethernet connection, and may have a keyboard, mouse, display, touch screen, printer, Internet connection, cellular connection and/ or camera as may be desired. The network interface may be any network card, device or adapter for providing network communication with other network devices. The industrial controller 12 connects and communicates over the network 14 with industrial controllers 16, 17, 18 and 20, each industrial controller also connecting and communicating over the network 14. The network 14 may be a control network using ControlNet, DeviceNet, EtherNet/IP or Sercos protocol, and may be using a router (not shown). The network 14 may include a bridge 15 for translating between different of the above standard or other protocols, and may also include additional industrial controllers and/or industrial devices.

The industrial controller 16 has additional network interfaces 22 and 24 for connecting and communicating over additional control networks 26 and 28, respectively. Additional network interfaces may include network cards, devices or adapters, such as network cards installed in slots within the industrial controller, for providing network communication with other devices. The industrial controller 16 connects and communicates over the network 26 with industrial devices 30, 32 and 34, each industrial device also connecting and communicating over the network 26. The network 26 may be a control network using ControlNet, DeviceNet, EtherNet/IP or Sercos network protocol. The network 26 may be using the same network protocol as network 14 or a different network protocol, and may be using a router (not shown). Additional industrial devices may also be present on the network 26.

The industrial device 30, in turn, may control through a contained I/O module or drive an industrial process, for example, detecting input AC or DC signals or controlling output AC or DC signals or running a motor or other machinery (e.g., actuator, relay, solenoid, motor, enunciator, lamp, etc.). The particular industrial process being controlled and the specific input and output module types are not material to the present invention. Additional industrial processes may also be controlled by the industrial device 30 through additionally contained I/O modules or drives. Similarly, the industrial devices 32 and 34 may each control industrial processes.

The additional control network 28 may be a network of the same type as the network 26 or network 14 or may be of a different type. For example, the network 14 may be a ControlNet network, while the network 26 may be a DeviceNet network and the network 28 may be an EtherNet/IP network, or they could all be the same. The industrial controller 16 connects and communicates over the control network 28 with industrial devices 46, 48, 50 and 52, each industrial device also connecting and communicating over the additional network 28, and each industrial device optionally controlling one or more industrial processes. The industrial controller 16 may also include more additional network interfaces for connecting and communicating over more additional networks to the extent the system allows, each of which being the same network or of different network types. Similarly, the industrial controllers 17, 18 and 20 may each have one or more additional network interfaces for connecting and communicating over one or more additional control networks with one or more industrial devices, each industrial device, if present, optionally controlling one or more industrial processes. The industrial control system 10 may be implemented, for example, using Logix™ components offered by Rockwell Automation, Inc. of Milwaukee, Wis.

The program 80 instructs the processor in the industrial controller 12 to retrieve installation information contained in the one or more industrial controllers and the one or more industrial devices by communicating over the first control network and the one or more additional control networks. The program 80 may be implemented, for example, using Add-On Instructions in a Logix™ based system or by using a conventional software programming language and compiler appropriate for the system. Installation information may include the device name, hardware area location with node number or IP address, serial number, manufacturing date, product type, device code, hardware description, firmware revision, major and minor fault flag, slot number and important condition monitoring parameters for each industrial controller and each industrial device, as well as any devices within each industrial controller and each industrial device. Such devices within may include, for example, network interface cards, devices or adapters and I/O modules or drives. An exemplary framework for communicating between the industrial controller 12 and the industrial controllers 16, 17, 18 and 20 is described in U.S. Pat. No. 6,819,960, entitled "Industrial Controller Automation Interface," subject to assignment to the assignee of the present application, and incorporated herein by reference in its entirety. The program 80 instructs the processor in the industrial controller 12 to build a data structure 82 comprising the retrieved information.

Figure 2:
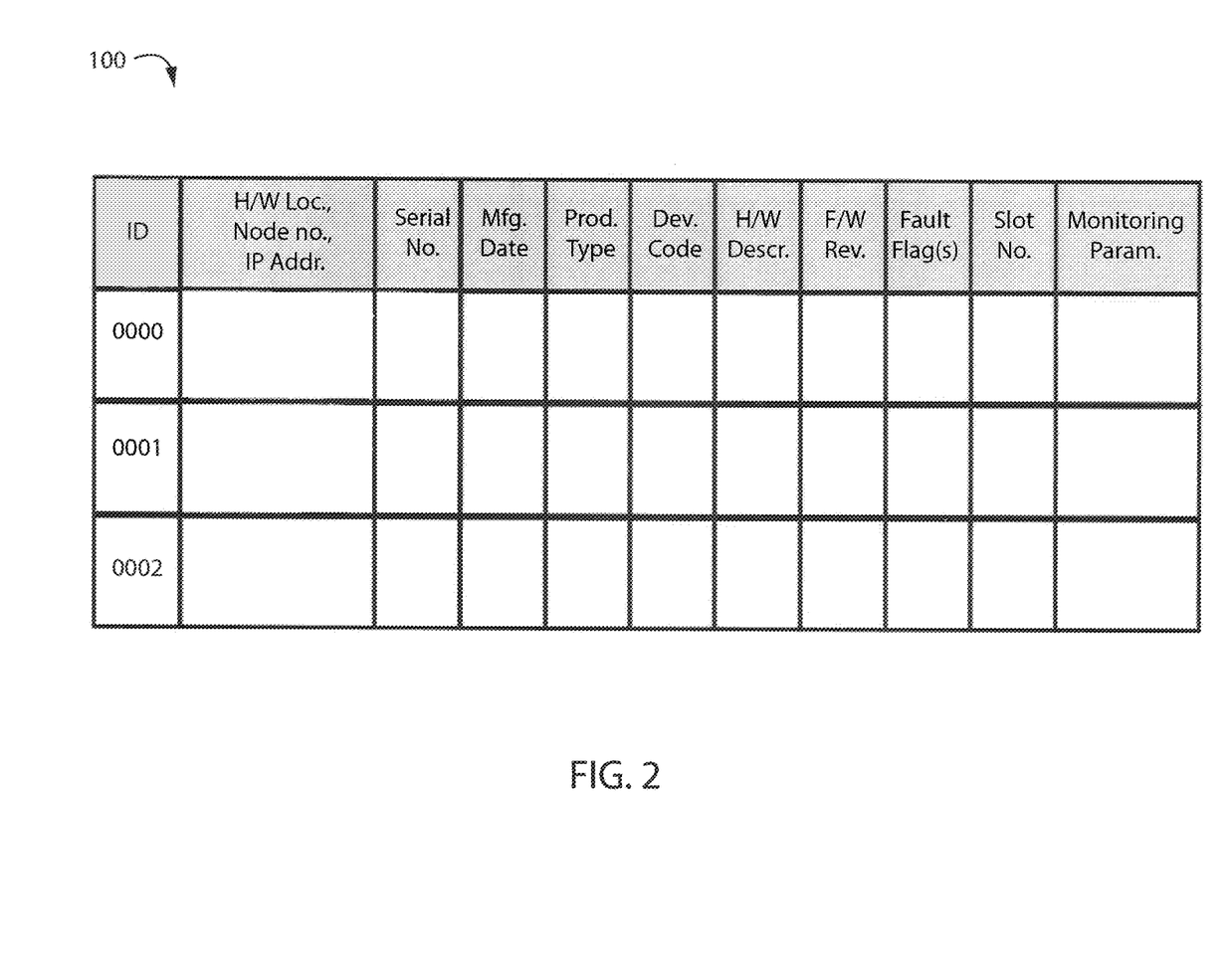
FIG. 2 is a table illustrating installation information collected in the system of FIG. 1.

Turning now to FIG. 2, a table diagram 100 illustrating the parameters of an exemplary data structure 82 is provided. The diagram 100 may include rows of the retrieved information with each row corresponding to a particular device containing the information. The rows may be assigned hardware location (identification) numbers for organization, such as "0000," "0001" and "0002," thereby distinguishing one row from another. Each column may provide a field, in addition to the row number, reflecting the retrieved information, such as the device name, hardware area location with node number or IP address, serial number, manufacturing date, product type, device code, hardware description, firmware revision, major and minor fault flag, slot number and condition monitoring parameters. Data structure 82 may be built in various manners from the retrieved information as known in the art, such as by using trees, arrays, tables and/or pointers.

Figure 3:
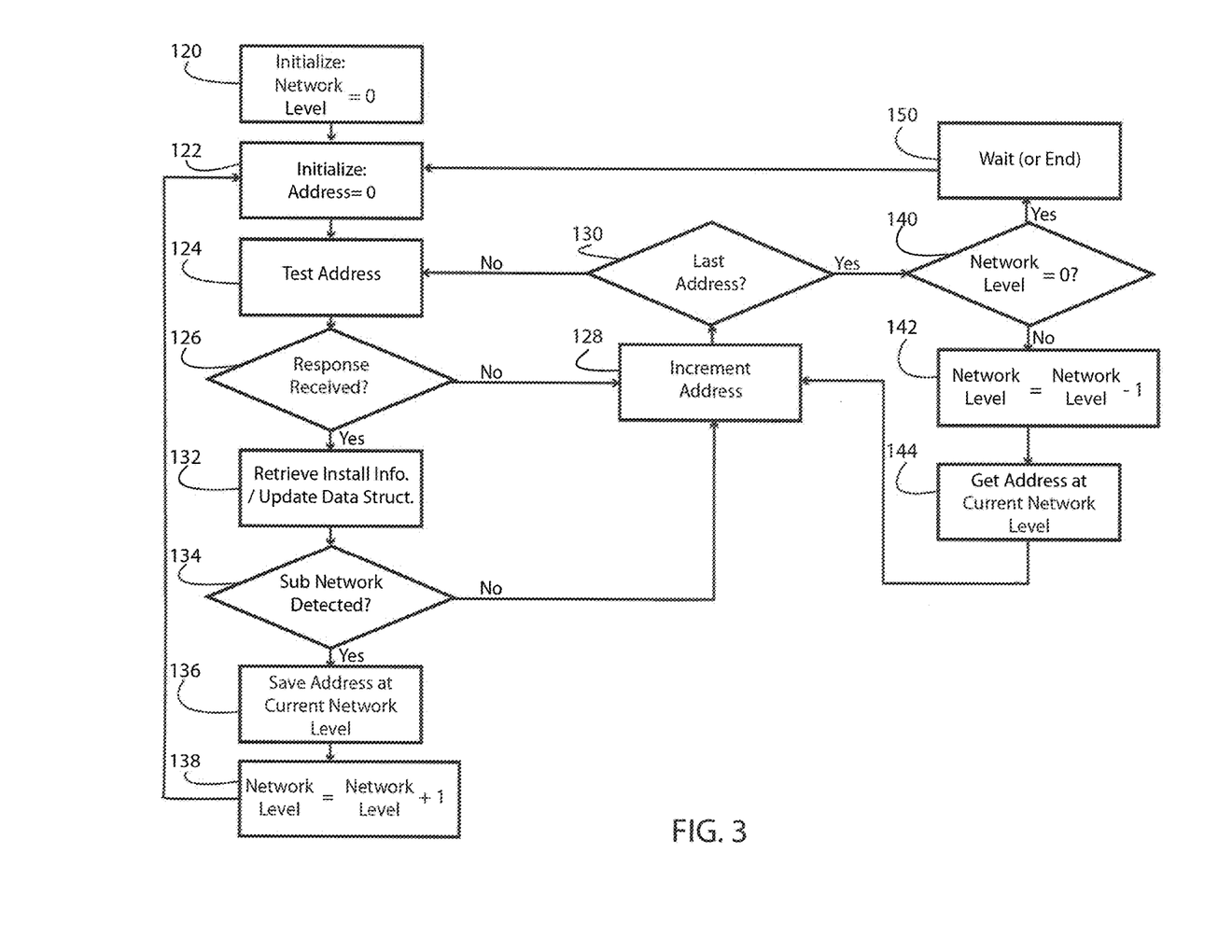
FIG. 3 is a simplified flow diagram of processing performed by an electronic computer in the system of FIG. 1, implementing retrieval of installation information and building a data structure comprising the retrieved information.

Turning now to FIG. 3 (and still referencing FIG. 1), a simplified flow diagram of the process performed by the industrial controller 12 in the system of FIG. 1 to implement retrieval of installation information and building of a data structure comprising the retrieved information is provided. In block 120, the program 80 initializes the network level to zero, thereby reflecting an analysis of the first network. Next, in block 122, the program 80 initializes to the first possible address for the first possible hardware device at the current network level, which may be the lowest possible address. An Internet Protocol address (IP address) may be used, for example, in systems adhering to Internet Protocol for communication, though alternative addressing schemes, such as media access control (MAC) addressing, may also be used. Next, in block 124, the program 80 instructs the processor in the industrial controller 12 to test the reachability of a device over the first network at the particular address. A ping may be used, for example, in systems adhering to Internet Protocol for communication, though alternative tests may also be used.

In block 126, the program 80, through the industrial controller 12, looks for a response from the test for reachability of a device. If no response is received, the initialized address is then incremented in block 128, and the program 80 then determines whether the last possible address has been reached in block 130. If the last possible address has not been reached, the program 80 returns to block 124 and again executes to cause the industrial controller 12 to test the reachability of a device over the first network at the current address. This loop continues until either a response is received in block 126 or the last possible address is reached in block 130.

If a response is received in block 126, such as from the industrial controller 16 over the first network 14, the program 80 executes in block 132 to instruct the processor in industrial controller 12 to retrieve the installation information from the device. In addition, the program 80 builds, continues to build and/or updates the data structure 82 comprising the retrieved information. Next, in block 134, the program 80 determines whether an additional network is present, for example, starting from the lowest possible location for a network interface device within the scanned device and iteratively looping until the last possible location. If an additional network is found to be present, in block 136, the program 80 saves the current network level and current address, and in block 138, increments the network level by one. The program 80 then returns, for example, to block 122 to initialize to the first possible address for the first possible hardware device at the current network level, and continues to test for devices over the additional network level until either a response is received in block 126 or the last possible address is reached in block 130, similar to that described above.

If the last possible address is reached in block 130, the program 80 then determines whether the network level is zero in block 140. If the network level is non-zero, as is the case when analyzing an additional network, the program 80, having now analyzed the additional network, decrements the network level by one in block 142 and retrieves the previously saved address at the current network level in block 144. The program 80 then returns to block 128 to increment the address level and again determine whether the last possible address has been reached in block 130. Thus, the program 80 iteratively analyzes networks and sub-networks at multiple levels.

If the last possible address is reached in block 130, and the network level is determined to be zero in block 140, thereby indicating the first network having been analyzed, the program 80 then ends in block 150 having completed an analysis of the installation information in the industrial system. In a preferred embodiment, the program 80 may wait for a predetermined amount of time then repeat the analysis of the industrial system by returning to block 122. As such, industrial controllers and/or industrial devices added, removed and/or updated periodically throughout the factory environment may be captured. Alternatively, the program 80 may wait to repeat the analysis of the industrial system until directed by the user interface 13.

Figure 4:
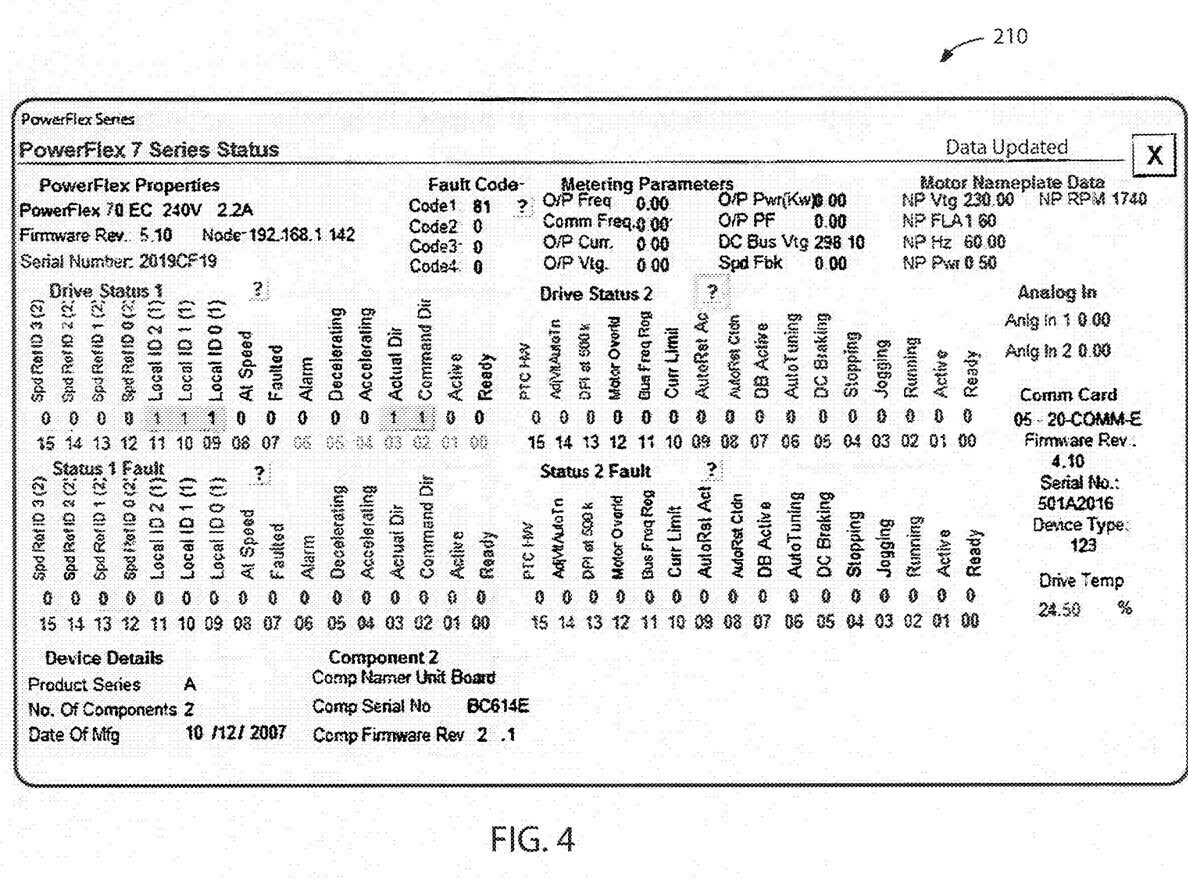
FIG. 4 is an exemplary interface pop-up for graphically displaying, configuring and monitoring parameters of the program and help buttons or icons in accordance with an embodiment.

Turning now to FIG. 4, an exemplary interface pop-up 210 for displaying, configuring and/or monitoring parameters relating to analysis of the system of FIG. 1 is shown. The pop-up 210 may be graphically displayed to the user interface 13 of the industrial controller 12 and may include, for example, the device name, hardware area location with node number or IP address, serial number, manufacturing date, product type, device code, hardware description, firmware revision, major and minor fault flag, slot number and important condition monitoring parameters. The pop-up 210 may also provide a parameter and fault help files which include possible causes of the fault and corrective actions. The pop-up 210 may also enable help information to be graphically displayed in an additional pop-up (not shown) by clicking an appropriate question mark or "Help" button on the pop-up 210. Such selection may lead, for example, to the additional pop-up graphically displaying to the user interface 13 help information such as explanatory details, user guide information, an interactive help library, company policy, support contact information and/or an Internet link.

Figure 5:
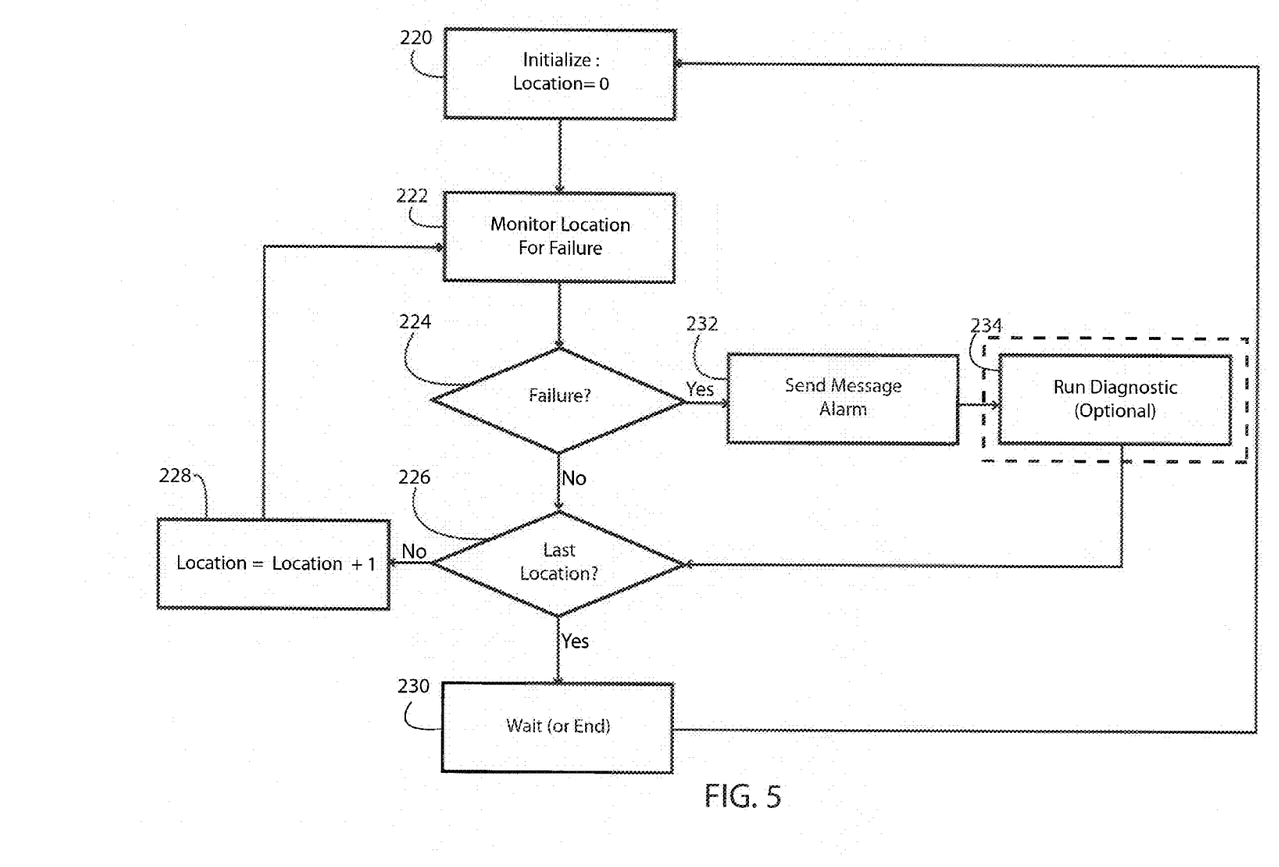
FIG. 5 is a simplified flow diagram of processing performed by an electronic computer in the system of FIG. 1 to monitor for a hardware failure and send a message alarm in response to detection of the failure.

Turning now to FIG. 5 (and still referencing FIG. 1), a simplified flow diagram of the process performed by the industrial controller 12 in the system of FIG. 1 to monitor for a hardware failure and send a message alarm in response to detection of the failure is provided. In block 220, the program 80 initializes the first hardware location to zero. This may correspond, for example, to the first row of the table as described with respect to FIG. 2 above, or the first entry for the data structure 82. Next, in block 222, the program 80 monitors the particular hardware location for a failure. This may include, for example, reading local settings, such as flags, registers or variables, contained in the device that directly report a failure, or reading local settings and comparing to an expected result.

Next, in block 224, the program 80 determines whether there is hardware failure detected. If no hardware failure is detected, the program 80 then determines whether the current location monitored is the last possible hardware location in block 226. If the current location monitored is not the last possible hardware location, the program 80 increments the current location to the next possible hardware location in block 228. This may correspond, for example, to the next row of the table as described with respect to FIG. 2 above, or the next entry for the data structure 82. Next, the program 80 returns to block 222 to monitor the particular hardware location for a hardware failure. This loop repeats until the last possible hardware location has been reached in block 226, at which point the program 80 ends at block 230 having completed an analysis for a hardware failure. In a preferred embodiment, the program 80 may wait for a predetermined amount of time then repeat the analysis of the industrial system by returning to block 220. As such, industrial controllers and/or industrial devices may be periodically monitored over the first network and the one or more additional networks for a hardware failure. Alternatively, the program 80 may wait to repeat the analysis of the industrial system until directed by the user interface 13.

If a hardware failure is detected in Hock 224, the program 80 sends a message alarm in response to detection of the hardware failure in block 232 indicating a hardware failure. The message alarm may comprise, for example, a graphical pop-up message to the user interface 13 of the industrial controller 12, a sound or beep to speakers attached to or embedded within the user interface 13, a printed report from a printer attached to the user interface 13, an electronic mail message to one or more recipients through an Internet connection attached to the user interface 13 or the industrial controller 12, an SMS text message to one or more recipients through an Internet or cellular connection attached to the user interface 13 or the industrial controller 12, or by any other mechanism known in the art. In a preferred embodiment, the message alarm includes installation information, such as device name, hardware area location with node number or IP address, serial number and/or hardware description, for precisely identifying the location of the hardware failure, as well as the date, time and general description of the hardware failure. In an alternative embodiment, the message alarm may also include detailed information specific to the hardware failure which may be obtained, for example, by performing a diagnostic as described below.

Figure 6:
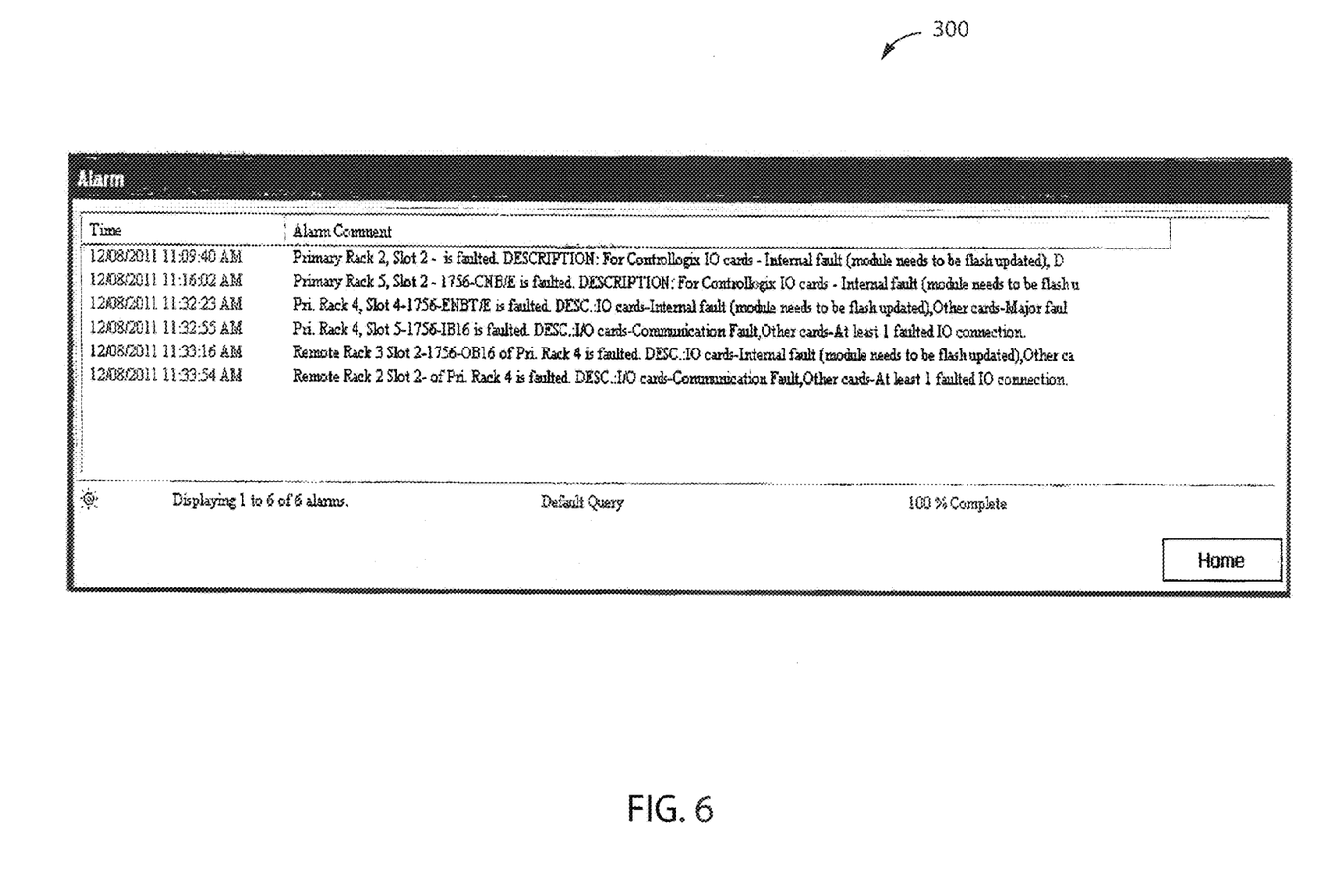
FIG. 6 is an exemplary interface screen for providing a message alarm to the user interface in the system of FIG. 1.

Turning briefly to FIG. 6, an exemplary interface screen 300 for providing a message alarm to the user interface 13 in the system of FIG. 1 is shown. The interface screen 300 may be graphically displayed to the user interface 13 of the industrial controller 12 as a pop-up message indicating a hardware failure. The interface screen 300 may display, for example, the date, time, installation information for identifying the location of the hardware failure (e.g., hardware description, address) and general description of the hardware failure as shown. Multiple message alarms occurring in the same analysis or over a historical period of analyses may be graphically displayed to the user interface 13 through the single interface screen by sequentially listing each message alarm. The interface screen 300 may also graphically display help information, similar to that described with respect to FIG. 4 above. Help information may include, for example, explanatory details, user guide information, an interactive help library, company policy, support contact information and/or an Internet link specific to the hardware failure.

Referring back to FIG. 5, the program 80 may next instruct the processor in the industrial controller 12 to perform (optionally) a diagnostic on the particular hardware location having the hardware failure in block 234 before returning to block 226 to determine whether the current location monitored is the last possible hardware location. Performing a diagnostic on the particular hardware location having a hardware failure may include sending one or more inputs to the industrial controller or industrial device and receiving one or more outputs from the industrial controller or industrial device, the one or more outputs including information specific to the hardware failure. For example, if a network connection failure is detected, the diagnostic may send a request to the hardware location for information concerning the network connection failure, such as link status, link speed, link duplex, connection timeout, alignment errors, single collisions, multiple collisions, late collisions, excessive collisions, frame check sequence errors, signal quality errors, deferred transmissions, MAC transmit or receive errors, carrier sense errors, excessive frame length, network update time, baud rate and retries allowed. In an alternative embodiment, the program 80 may instruct the processor in the industrial controller 12 to perform a diagnostic on any particular hardware location on demand, whether a failure has occurred or not, to further inspect and verify the health of the hardware location.

Figure 7:
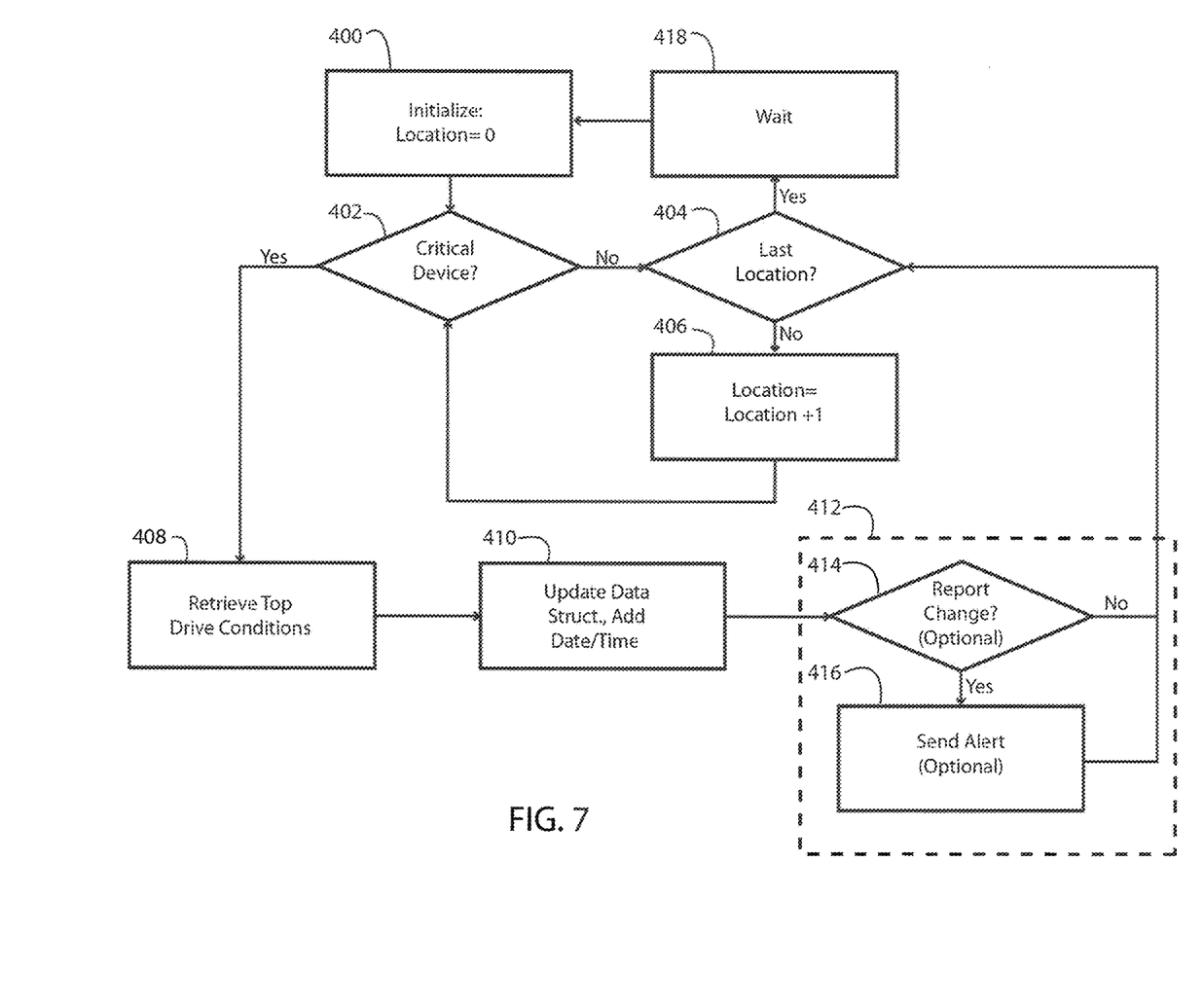
FIG. 7 is a simplified flow diagram for condition monitoring performed by an electronic computer in the system of FIG. 1.

Turning now to FIG. 7 (and still referencing FIG. 1), a simplified flow diagram of the process performed by the industrial controller 12 in the system of FIG. 1 for condition monitoring is provided. In block 400, the program 80 initializes the first hardware location to zero. This may correspond, for example, to the first row of the table as described with respect to FIG. 2 above, or the first entry for the data structure 82. Next, in block 402, the program 80 determines whether the particular hardware location is a critical device for condition monitoring. In a preferred embodiment, a subset of the total number of hardware locations in the system, such as ten hardware locations in a system of many, may be designated as critical devices for condition monitoring, though every location may be monitored. Such critical device designation may occur, for example, by flagging a hardware location through the program 80 in the data structure 82.

If a hardware location is determined not to be a critical device in block 402, the program 80 then determines whether the current location monitored is the last possible hardware location in block 404. If the current location monitored is not the last possible hardware location, the program 80 increments the current location to the next possible hardware location in block 406. This may correspond, for example, to the next row of the table as described with respect to FIG. 2 above, or the next entry for the data structure 82. Next, the program 80 returns to block 402 to determine whether the hardware location is a critical device for condition monitoring. This loop repeats until the last possible hardware location has been reached in block 404, at which point the program 80 may wait for a predetermined amount of time in block 418 then repeat the condition monitoring by returning to block 400.

If a hardware location is determined to be a critical device in block 402, the program 80 then executes in block 408 to instruct the processor in industrial controller 12 to retrieve the important condition monitoring parameters from the device. Important condition monitoring parameters may be specified via program 80 and may include, for example, drive temperature, network collisions, etc. The program 80 then updates the data structure 82, or may create an alternate data structure, comprising the important condition monitoring parameters as well as the date and time of the condition monitoring.

Next, in optional block 412, the program 80 may determine in sub-block 414 whether an important change in a condition monitoring parameter has occurred that should be reported. Important changes in condition monitoring parameters may be set as triggers via program 80 and may include, for example, drive temperature exceeding a specified amount, network collisions exceeding a specified amount, etc. If an important change in a condition monitoring parameter has occurred that should be reported, the program 80 may send an alert in sub-block 416. The alert may comprise, for example, a graphical pop-up message to the user interface 13 of the computer 12, a sound or beep to speakers attached to or embedded within the computer 12, a printed report from a printer attached to the computer 12, an electronic mail message to one or more recipients through an Internet connection via computer 12, an SMS text message to one or more recipients through an Internet or cellular connection via computer 12, or by any other mechanism known in the art.

The program 80 then returns to block 404 to determine whether the current location monitored is the last possible hardware location. If the current location monitored is not the last possible hardware location, the program 80 increments the current location to the next possible hardware location in block 406 and the loop continues. The loop repeats until the last possible hardware location has been reached in block 404, at which point the program 80 may wait for a predetermined amount of time in block 418 then repeat the condition monitoring by returning to block 400.

In alternative embodiments, the process to monitor for a hardware failure and send a message alarm in response to detection of the failure may be executed in various combinations with the process for retrieval of installation information and building of a data structure comprising the retrieved information. For example, referring briefly to FIGS. 3 and 5 together, after installation information is retrieved in block 132 and the program 80 builds, continues to build and/or updates the data structure 82, the program 80 could then proceed to block 222 to monitor the particular hardware location for a hardware failure. If no hardware failure is detected in block 224, the program 80 could then return to block 134 to determine whether an additional network is present. If a hardware failure is detected in block 224, the program 80 could then send a message alarm in response to detection of the hardware failure in block 232 and optionally perform a diagnostic on the particular hardware location having the hardware failure in block 234 before returning to block 134 to determine whether an additional network is present. Similarly, the process for condition monitoring may be executed in various combinations with the process for retrieval of installation information and building of a data structure comprising the retrieved information, or the process to monitor for a hardware failure and send a message alarm in response to detection of the failure.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom" and "side" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An industrial controller with a processor executing a program stored in a non-transitory computer-readable storage medium and having a network interface, the network interface for communicating over a first control network with another device having a network interface, wherein the program instructs the processor to perform the following steps:
   (a) test a plurality of addresses of the first control network to determine a presence of a first-level device on the first control network, wherein an address is tested by sending a message to the address and determining if a response is received, and wherein a next address is tested upon determining that a response is not received;
   (b) upon determining a presence of the first-level device:
      (i) retrieve installation information including device name and IP address contained in the first-level device by communicating with the first-level device over the first control network;
      (ii) communicate through the first-level device to test a plurality of addresses of a second control network connected to the first-level device to determine a presence of a second-level device on the second control network, wherein an address is tested by sending a message to the address and determining if a response is received, and wherein a next address is tested upon determining that a response is not received;
      (iii) build a data structure comprising the retrieved information from the first-level device;
      (iv) periodically monitor the first-level device provided in the data structure for a hardware failure by communicating with the first-level device over the first control network; and
      (v) upon detecting a hardware failure of the first-level device, send a message alarm in response to detection of the hardware failure; and
   (c) upon determining a presence of the second-level device:
      (i) retrieve installation information contained in the second-level device by communicating with the second-level device through the first-level device, wherein the first-level and second-level devices are on the first and second control networks, respectively;
      (ii) update the data structure to include the retrieved information from the second-level device;
      (iii) periodically monitor the second-level device provided in the data structure for a hardware failure by communicating with the second-level device through the first-level device, wherein the first-level and second-level devices are on the first-level and second-level control networks, respectively; and
      (iv) upon detecting a hardware failure of the second-level device, send a message alarm in response to detection of the hardware failure,
   wherein the first and second control networks are separate control networks and the second control network is a sub-network of the first-level device that is accessible through the first-level device.

2. The industrial controller of claim 1, further comprising performing a diagnostic on a device having a hardware failure by sending an input to the device and receiving an output from the device, the output including information specific to the hardware failure.

3. The industrial controller of claim 1, further comprising monitoring a condition of a parameter contained in a device by periodically retrieving the parameter from the device and updating the data structure with the retrieved parameter.

4. The industrial controller of claim 1, wherein the installation information retrieved from a device includes a hardware area location.

5. The industrial controller of claim 1, wherein the installation information retrieved from a device includes information for a network card installed in the device.

6. The industrial controller of claim 1, wherein the installation information retrieved from a device includes information for an I/O module installed in the device.

7. The industrial controller of claim 1, further comprising graphically displaying a pop-up to a user interface showing installation information, the pop-up also including an icon for graphically displaying help information.

8. The industrial controller of claim 1, wherein detection of a hardware failure occurs upon retrieving a local setting in a device that indicates a failure.

9. The industrial controller of claim 1, wherein detection of a hardware failure occurs upon retrieving a local setting in a device that does not meet an expected result.

10. The industrial controller of claim 1, wherein the message alarm includes the date and time of a hardware failure and installation information identifying a hardware area location of the hardware failure.

11. The industrial controller of claim 10, further comprising graphically displaying the message alarm to a user interface.

12. The industrial controller of claim 10, further comprising sending the message alarm via electronic mail.

13. The industrial controller of claim 1, wherein communicating over the second control network uses a protocol different than communicating over the first control network.

14. A method for retrieving installation information and monitoring for a hardware failure using a system with a processor and a network interface, the network interface for communicating over a first control network, the method comprising:
   (a) testing a plurality of addresses of the first control network to determine a presence of a first-level device on the first control network, wherein an address is tested by sending a message to the address and determining if a response is received, and wherein a next address is tested upon determining that a response is not received;
   (b) upon determining a presence of the first-level device:
      (i) using the industrial controller to retrieve installation information including a device name and IP address contained in the first-level device by communicating with the first-level device over the first control network;
      (ii) communicating through the first-level device to test a plurality of addresses of a second control network connected to the first-level device to determine a presence of a second-level device on the second control network, wherein an address is tested by sending a message to the address and determining if a response is received, and wherein a next address is tested upon determining that a response is not received;
      (iii) building a data structure comprising the retrieved information from the first-level device;
      (iv) periodically monitoring the first-level device provided in the data structure for a hardware failure by communicating over the first control network; and (v) upon detecting a hardware failure of the first-level device, sending a message alarm in response to detection of the hardware failure; and (c) upon determining a presence of the second-level device:
  (i) using the industrial controller to retrieve installation information contained in the second-level device by communicating with the second level device through the first-level device, wherein the first-level and second-level devices are on the first and second control networks, respectively;
  (ii) updating the data structure to include the retrieved information from the second-level device;
  (iii) periodically monitoring the second-level device provided in the data structure for a hardware failure by communicating with the second-level device through the first-level device, wherein the first-level and second-level devices are on the first and second control networks, respectively; and
  (iv) upon detecting a hardware failure of the second-level device, sending a message alarm in response to detection of the hardware failure,
wherein the first and second control networks are separate control networks and the second control network is a sub-network of the first-level device that is acessible through the first-level device.

15. The method of claim 14, further comprising, upon determining a presence of the second-level device, performing a diagnostic on the second-level device having a hardware failure by sending an input to the second-level device and receiving an output from the second-level device, the output including information specific to the hardware failure.

16. The method of claim 14, further comprising, upon determining a presence of the second-level device, monitoring the condition of a parameter contained in the second-level device by periodically retrieving the parameter from the second-level device and updating the data structure with the retrieved parameter.

17. The method of claim 14, wherein the installation information retrieved from the first-level device includes a hardware area location.

18. The method of claim 14, wherein detection of a hardware failure occurs upon retrieving a local setting in a device that indicates a failure.

19. The method of claim 14, wherein detection of a hardware failure occurs upon retrieving a local setting in a device and determining that the local setting does not meet an expected result.

20. A system having a processor executing a program stored in a non-transitory computer-readable storage medium and a network interface for communicating over a first control network, the processor executing the program to:

(a) test a plurality of addresses of the first control network to determine a presence of a first-level device on the first control network, wherein an address is tested by sending a message to the address and determining if a response is received, and wherein a next address is tested upon determining that a response is not received;

(b) upon determining a presence of the first-level device:
  (i) retrieve installation information including a device name and an address contained in the first-level device by communicating with the first-level device over the first control network;
  (ii) communicate through the first-level device to test a plurality of addresses of a second control network connected to the first-level device to determine a presence of a second-level device on the second control network, wherein an address is tested by sending a message to the address and determining if a response is received, and wherein a next address is tested upon determining that a response is not received; and
  (iii) build a data structure comprising the retrieved information from the first-level device; and (c) upon determining a presence of the second-level device:
  (i) retrieve installation information contained in the second-level device by communicating with the second-level device through the first-level device, wherein the first-level and second-level devices are on the first and second control networks, respectively; and
  (ii) update the data structure to include the retrieved information from the second-level device;
wherein the first and second control networks are separate control networks, the first-level device is present on the first and second control networks, and the second control network is accessible through the first-level device.

21. The system of claim 20, further comprising periodically monitoring the first-level device provided in the data structure for a hardware failure by communicating with the first-level device over the first control network.

22. The system of claim 21, further comprising, upon detecting a hardware failure of the first-level device, sending a message alarm in response to detection of the hardware failure.

23. The system of claim 20, further comprising periodically monitoring the second-level device provided in the data structure for a hardware failure by communicating with the second-level device through the first-level device, wherein the first-level and second-level devices are on the first-level and second-level control networks, respectively.

24. The system of claim 23, further comprising, upon detecting a hardware failure of the second-level device, sending a message alarm in response to detection of the hardware failure.

25. The system of claim 20, wherein the system is configured as a programmable logic controller (PLC).

26. The system of claim 20, wherein the address is an IP address.

27. The system of claim 20, wherein the first and second control networks use ControlNet, DeviceNet, EtherNet/IP or Sercos protocols.

28. The system of claim 27, wherein the installation information retrieved from a device includes information for a network card installed in the device, wherein the network card uses the ControlNet, DeviceNet, EtherNet/IP or Sercos protocol.

* * * * *